United States Patent [19]

Brown

[11] Patent Number: 4,576,319
[45] Date of Patent: Mar. 18, 1986

[54] BLOCK STORAGE

[76] Inventor: Bill G. Brown, Box 1258, Levelland, Tex. 79336

[21] Appl. No.: 658,320

[22] Filed: Oct. 5, 1984

[51] Int. Cl.[4] .............................................. B60R 9/00
[52] U.S. Cl. ................................ 224/42.41; 224/273; 296/37.1
[58] Field of Search ...................... 414/462; 224/42.41, 224/42.23, 273, 42.42, 42.45, 42.03 R, 42.03 A, 42.07; 296/37.6, 37.1, 37.14; 280/763.1

[56] References Cited

U.S. PATENT DOCUMENTS

| | | | |
|---|---|---|---|
| 2,417,952 | 3/1947 | Selzer et al. | 224/42.23 X |
| 3,187,914 | 6/1965 | Peras | 224/42.23 X |
| 3,764,048 | 10/1973 | Gore | 224/42.21 |
| 3,879,055 | 4/1975 | Sill et al. | 280/763.1 |
| 4,049,312 | 9/1977 | Rudbeck | 224/42.21 X |
| 4,228,936 | 10/1980 | Rife | 224/42.21 X |
| 4,317,533 | 3/1982 | Barre et al. | 224/42.23 X |
| 4,384,815 | 5/1983 | Suzuki et al. | 224/42.23 X |
| 4,428,513 | 1/1984 | Delmastro | 224/42.23 X |
| 4,474,387 | 10/1984 | Maranell et al. | 280/763.1 X |

FOREIGN PATENT DOCUMENTS 571193  2/1933  Fed. Rep. of Germany ... 296/37.14

Primary Examiner—Stephen Marcus
Assistant Examiner—Robert Petrik
Attorney, Agent, or Firm—Wendell Coffee; Montgomery W. Smith

[57] ABSTRACT

A rack is mounted near each leveling jack of a motor home or other recreational vehicle for convenient storage and retrieval of a jacking block. The ends of the jacking block are engaged by an inboard fixed lip of the rack and an outboard, pivoted, spring biased lip of the rack. Eccentric connection of the springs to the pivotable lip facilitates one-handed insertion and removal of the block.

3 Claims, 9 Drawing Figures

U.S. Patent  Mar. 18, 1986  Sheet 1 of 2  4,576,319
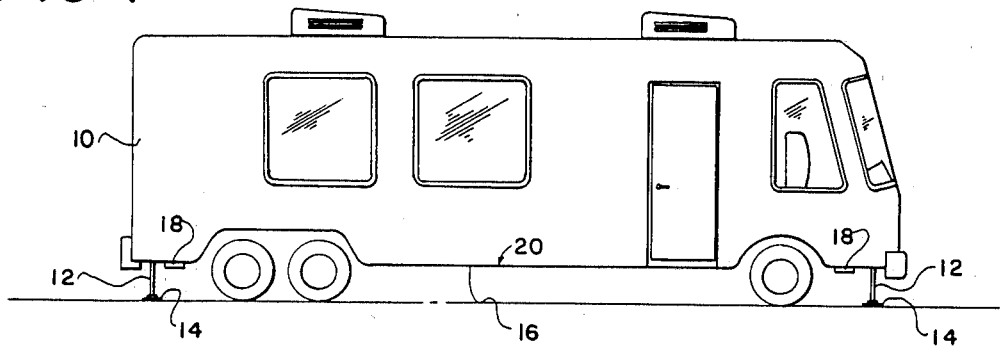
FIG-1
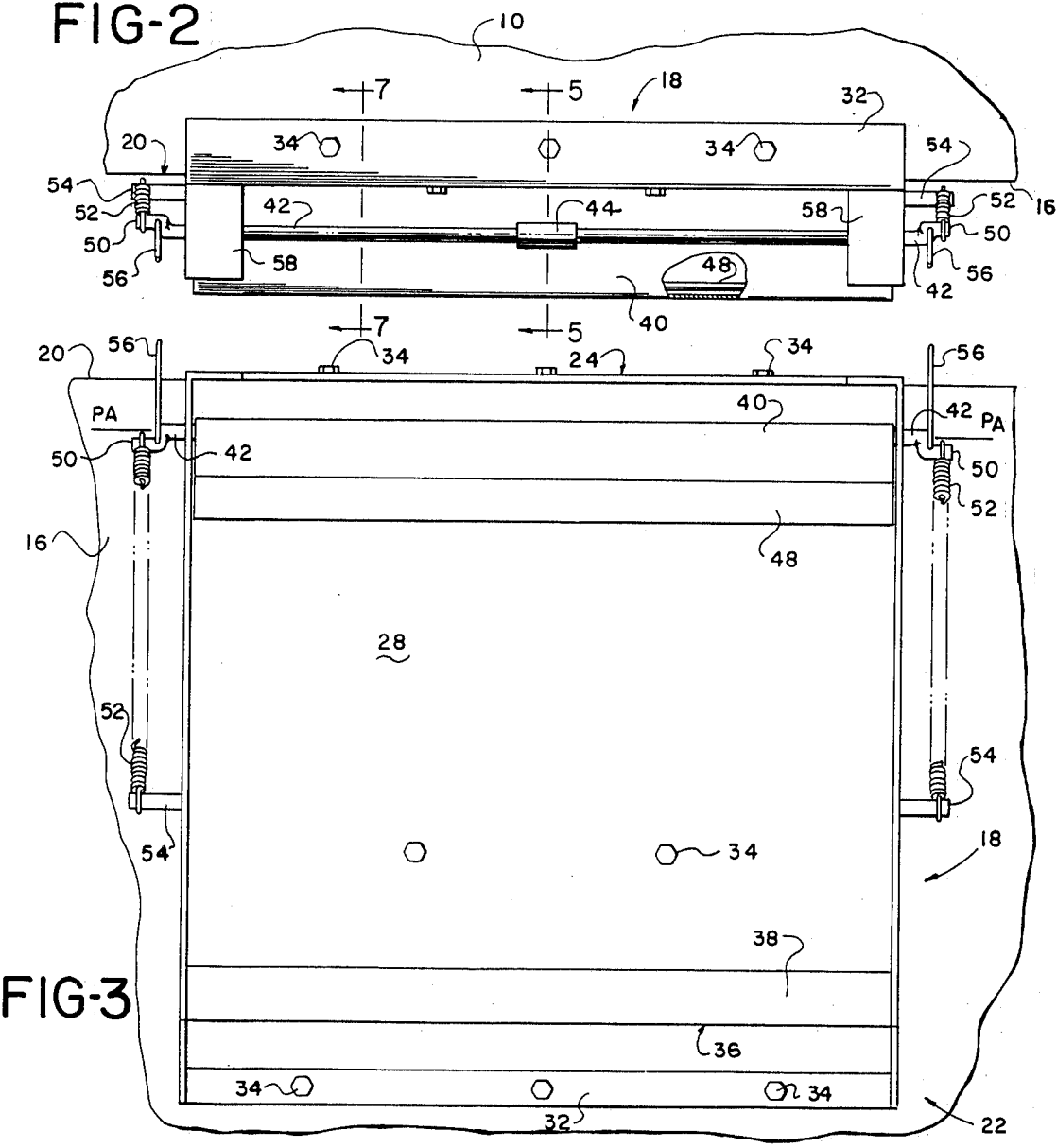
FIG-2
FIG-3

BLOCK STORAGE

BACKGROUND OF THE INVENTION (1) Field of the Invention

This invention relates to recreational vehicles and especially to blocks used with leveling jacks of such vehicles.

(2) Description of the Prior Art

Many recreational vehicles, such as motor homes and campers, employ leveling jacks to stabilize and level the vehicle when parked. Because the leveling jacks are ordinarily folded up or stowed during travel, the jack bases are usually small in area. When attempting to level the vehicle on soft ground, the jacked load, distributed over the small area of the jack base, may not be supported by the ground beneath the jack base.

Therefore, most owners and operators of such recreational vehicles carry jacking blocks. The blocks have greater surface area than the jack bases, and can distribute the load of the leveling jacks onto a larger patch of soft ground. For example, a typical area of a jack base plate is four square inches, or two inches on each side, whereas a typical size for a jacking block is 10" long by 10" wide by 1" thick.

Before my invention, jacking blocks were customarily kept inside the recreational vehicle, sometimes wrapped in towels or other coverings, since the blocks tend to get dirty. This made it necessary to search for the blocks when they were needed, and required the use of otherwise useful space inside the recreational vehicle.

Before filing this application, a search was made in the United States Patent and Trademark Office. The search developed the following U.S. Patents.

Cohen—U.S. Pat. No. 2,607,518,
Du Shane—U.S. Pat. No. 2,985,351,
Sawby—U.S. Pat. No. 4,249,685.

Although applicant does not regard these references as particularly pertinent to his invention, they are cited because the Examiner might find these patents, found by an experienced searcher, relevant to the examination of this application.

SUMMARY OF THE INVENTION (1) New Function and Surprising Results

The block storage method and structure of my invention solves the problems noted above. The operator of the leveling jacks may obtain or store a jacking block, from a convenient position near each jack, with one hand. The storage rack frees the space inside the vehicle for beneficial uses.

The rack uses two lips to engage beneath the ends of the block, with spring mounted biasing structure to maintain the lips engaged with the block. The biasing structure is moved to disengage one lip, and the block is then manually pulled from engagement with the other lip. Thus, it may be seen that the function of the total combination far exceeds the sum of the functions of the individual elements, such as springs, rods, plates, etc. cl (2) Objects of this Invention An object of this invention is the convenient storage of blocks used with leveling jacks of recreational vehicles.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

Other objects are to achieve the above with a method that is versatile, ecologically compatible, energy conserving, rapid, efficient, and inexpensive, and does not require skilled people to install, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a side elevation view showing the positional mounting of the storage racks of this invention on a recreational vehicle.

FIG. 2 is a front elevation view of an embodiment of my invention mounted on a vehicle.

FIG. 3 is a bottom plan view of the embodiment shown in FIG. 2.

DESCRIPTION OF THE PREFERRED EMBODIMENT

Figure 4:
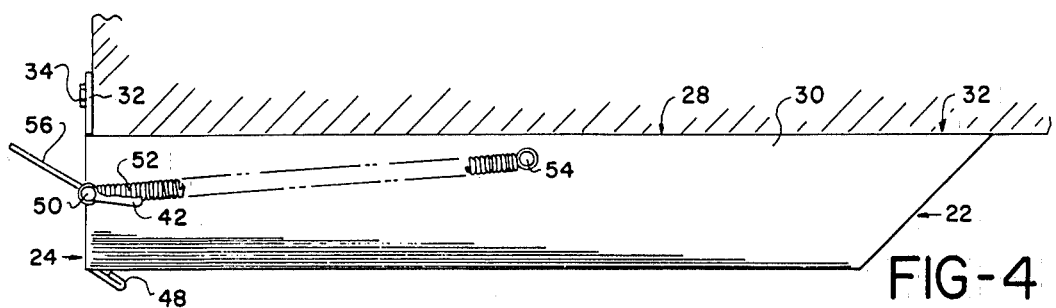
FIG. 4 is a side elevation view of the storage rack shown in FIG. 2, with the catch plate in the open position.

Referring to FIG. 1, recreational vehicle 10 has foldable, stowable leveling jacks 12 extended toward the ground therefrom. Jacking blocks 14 support the jacks 12 and the vehicle 10 on the ground. As described above, the blocks 14 are customarily used where the small surface area of the jack base would sink into soft ground. The jacks 12 are usually mounted to underside 16 of the vehicle 10 spaced above the ground, and are customarily folded against the underside 16 when not in use.

Each block 14 has a length, width, and thickness. The blocks 14 also preferably have finger hole 26 (FIG. 5) therein for convenient handling of the block. For the sake of reference the block has inboard and outboard ends, and the same thickness at each end. Of course, the thicknesses of the block ends, and the block dimensions, could be different.

Block racks 18, according to my invention, are positioned at points on the underside 16 convenient to one operating each of the leveling jacks 12, as shown.

Referring to FIGS. 2 and 3, each rack 18 is preferably mounted at periphery 20 of the underside 16. The rack 18 has an inboard end 22 and an outboard end 24. Each rack 18 has top 28, and sides 30 depending from the top 28 and extending between the ends 22 and 24. The sides 30 are preferably spaced apart slightly more than the width of the block 14.

Flanges 32 are connected to, or are preferably part of, the top 28, and provide a convenient point of connection of the rack 18 to the vehicle 10. Screws 34 are inserted through the flanges 32 and preferably through the top 28 between the flanges to insure rigid and secure mounting of the rack to the vehicle with the top proximate, and preferably against, the underside.

Inboard plate 36 is preferably spot welded to the top 28 and sides 30 at the inboard rack end 22 between the sides 30. The plate 36 extends downward from the top, and serves as a stop for the block 14 when inserted in an inboard direction between the sides. Inboard lip 38 of the inboard plate 36 extends outboard from the inboard plate 36 and is spaced away from the top 28 slightly more than the thickness of the inboard end of a block used with the rack.

Catch plate 40 is movably mounted or pivoted to the rack 18 at the outboard rack end 24 between the sides 30 by pivot rods 42 extending through the sides 30. Pivot axis "PA" extends through the rods 42 at the sides 30. The pivot rods extend through the sides 30 and are attached to the catch plate 40 preferably by welding the rods at catch tabs 46 at the ends of the catch plate. For the embodiment shown, the pivot rods extend toward each other from the two sides 30 and are joined by pin connector 44. It will be understood that other structure could be used such as welding or attaching ends of the rods directly to the catch plate 40 inboard of the tabs 46, or by using a single continuous rod.

The bias plate or catch or catch plate 40 has catch lip 48 extending inboard therefrom. When the catch plate 40 is substantially vertical, the catch lip 48 preferably extends horizontally toward the inboard lip 38, and is spaced from the top 28 slightly more than the thickness of the outboard end of the block to be used with the rack 18.

Each of the pivot rods 42 preferably incorporate crank rods 50 at the ends thereof outside the sides 30. The crank rods 50 are eccentric to the pivot axis "PA", and define an arc about the pivot rods 42 when the catch plate 40 is pivoted.

Figure 6:
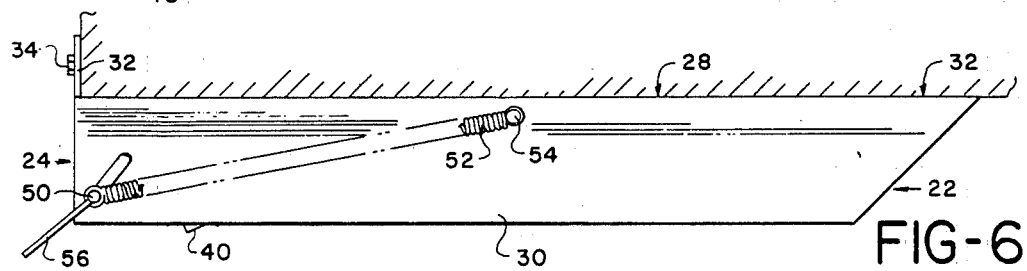
FIG. 6 a side elevation view of the embodiment shown in FIG. 2, with the catch plate in the closed position.

Springs 52 connect each crank rod 50 with a spring pin 54 extending from the sides 30 inboard of the pivot axis and crank rods 50. The springs 52, in combination with the catch plate and rods 42 and 50, form biasing means and structure for maintaining the block ends engaged with the lips 38 and 48 and retained between the lips and the top 28, by enabling the catch lip 48 to be maintained in engagement with and below the outboard block end, in a closed position as shown in FIG. 6, biased toward the inboard rack end. The springs 52 are preferably strong enough to maintain the catch lip 48 against the block 14 during travel of the vehicle 10 over bumpy roads, and during stiff jarring impacts with road imperfections, but not so strong as to make manual pivoting of the catch plate 40 with levers 56, attached to the pivot rods, extending from the crank rods 50, difficult.

Stop tabs 58 at the outboard end of the rack 18 reinforce the rack, and abut the catch plate to prevent pivoting of the catch plate 40 past the outboard end. The pivot axis "PA" is preferably spaced away from the outboard end and the stop tabs 58 so that when the catch plate 40 and crank rods 50 are in an open position, as shown in FIG. 4, the catch lip 48 is sufficiently outboard of or spaced away from the inboard lip 38 for the inboard end of a block 14 to be inserted between the inboard lip 38 and the top 28, and the outboard block end to be positioned and inserted past and inboard of the catch lip 48 and toward the top 28, as shown in FIG. 5.

Figure 8:
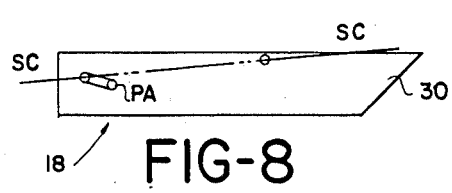
FIG. 8 is a schematic side view of the embodiment shown in FIG. 4.
Figure 9:
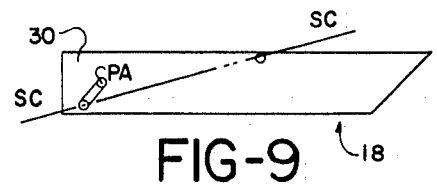
FIG. 9 is a schematic side view of the embodiment shown in FIG. 6.

Referring to FIGS. 8 and 9, the springs 52 operate through straight spring centerlines "SC" extending from the crank rods 50. When the catch plate 40 is in the open position, the crank rods are positioned so that the spring centerlines "SC", as schematically shown in FIG. 8, are extended above the pivoted the pivot axis "PA" causing the springs to bias the catch lip in an outboard direction against the stop tabs 58.

When the catch plate 40 is in the closed position, the crank rods 50 are positioned so that the spring centerlines "SC", as schematically shown in FIG. 9, are extended below the pivot axis "PA" causing the springs to bias the catch lip in an inboard direction away from the stop tabs.

Figure 5:
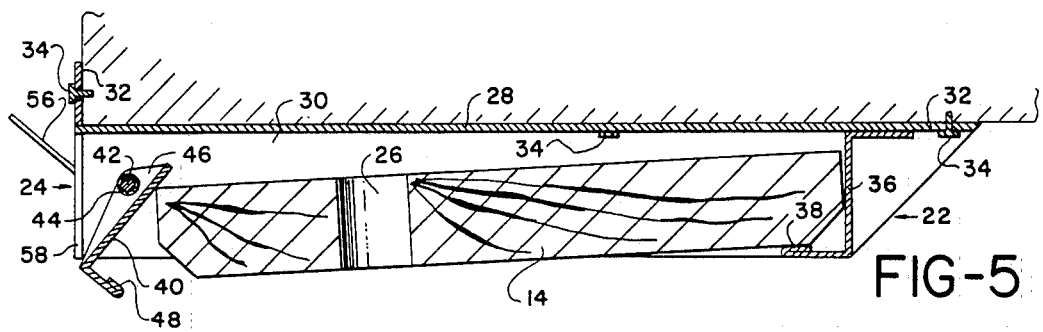
FIG. 5 is a side section view taken substantially along line 5—5 of FIG. 2, with the catch plate in the open position.

It is preferred that part of the catch plate opposite the catch lip extends past and inboard of the pivot rods and pivot axis, so that in the open position shown in FIGS. 4 and 5, the catch plate 40 will be contacted by the outboard block end as it is pushed toward the top 28. The catch plate 40 will move or pivot as the block is pushed upward, thereby rotating the crank rods 50 downward, so that the spring centerline is moved below the pivot axis.

Figure 7:
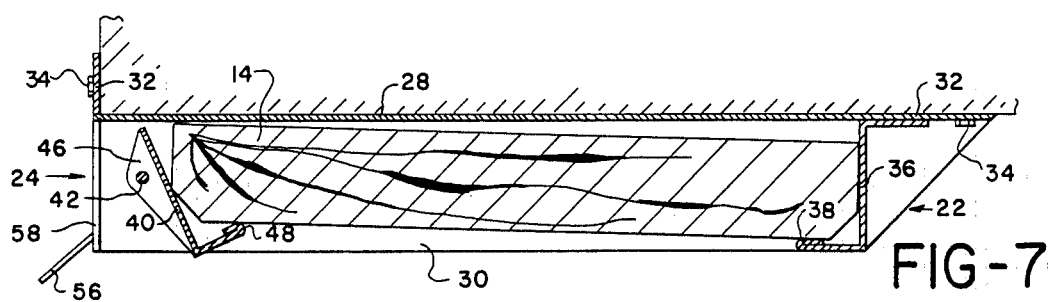
FIG. 7 is a side section view taken substantially along line 7—7 of FIG. 2, with the catch plate in the closed position.

After the spring centerline is below the pivot axis, the catch lip 48 will be biased by the sring toward the inboard lip and away from the stop tabs 58, thereby causing the catch lip 48 to snap beneath and engage the outboard block end as shown in FIG. 6 and 7. The crank rods are preferably oriented with respect to the catch plate so that only a light or small rotation from the open position will move the spring centerline below the pivot axis.

Having described the structure of an embodiment according to my invention, the operation or method of my invention may be seen to occur as follows. When it is determined that the recreational vehicle will be set up, the operator will unfold the leveling jacks, so that they depend toward the ground from the underside of the vehicle 10. The operator may decide to lower or extend the jack toward the ground to better determine the position at which the block may be placed, or he may wait until the block is removed from the rack 18, as desired.

The block is removed from the rack 18 by lifting one of the levers 56 upward, which pivots the catch plate 40 and moves the catch lip 48 outboard, disengaging the catch lip from the block. When the lever is moved sufficiently upward to move the spring center line past the pivot axis, the spring will bias the lip toward and against the stop tabs 58 and maintain the catch plate 40 and catch lip 48 in the open position.

When the catch lip 48 clears the block end, the block 14 will fall downward, where it may be grasped by the vehicle operator, preferably at the convenient finger hole 26 thereof. The block is then pulled in the outboard direction, disengaging it from between the inboard lip and the top 28. The block is then positioned on the ground beneath the jack. The jack is then extended or jacked downward against the block. When the vehicle is jacked as desired, the load of the jack will be exerted substantially over the surface area of the block on the ground.

When it is determined to prepare the vehicle for travel, the operator will unjack the jack, removing the load from the block, retract the base of the jack upward and fold it underneath the vehicle. These steps may be interrupted by storage of the block or storage of the block may be performed thereafter, as desired.

The block 14 is stored by grasping the block by hand, lifting the block from the ground, and inserting one block end between the inboard lip and the top of the rack. The block is then pressed upward toward the rack top. When the outboard block end contacts the end of the catch plate 40 opposite the catch lip 48, and is then pressed further upward, the catch lip 48 will pivot in the inboard direction, thereby moving the spring centerlines downward past the pivot axis. As this occurs, the springs will bias the catch lip toward the inboard lip, snapping the block against the top, and engaging the block therebeneath with the catch lip 48.

These steps would of course be repeated for the other jacks and racks 18 on the vehicle.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| Catalog of Elements | | | |
|---|---|---|---|
| 10 | vehicle | 36 | inboard plate |
| 12 | leveling jacks | 38 | inboard lip |
| 14 | blocks | 40 | catch plate |
| 16 | underside | 42 | pivot rods |
| 18 | racks | 44 | pin connector |
| 20 | periphery | 46 | catch tabs |
| 22 | inboard end | 48 | catch lip |
| 24 | outboard end | 50 | crank rods |
| 26 | finger hole | 52 | springs |
| 28 | top | 54 | spring pins |
| 30 | sides | 56 | levers |
| 32 | flanges | 58 | stop tabs |
| 34 | screws | | |

I claim as my invention:

1. In combination with
  a. a vehicle having
  b. an underside spaced above the ground,
  c. a periphery of the underside, and
  d. at least one leveling jack mounted on the vehicle;
the improved structure comprising:
  e. a block for supporting the jack on the ground,
  f. a rack attached to the underside of the vehicle, having
  g. a top,
  h. an open bottom, and
  i. sides connected to the top and spaced apart more than the block width,
  j. a stationary inboard plate of the rack spaced away from the vehicle periphery,
  k. the inboard plate having an inboard lip that extends toward the vehicle periphery,
  l. a movable catch plate journaled to the sides of the rack by a pivot rod near the vehicle periphery for movement about a horizontal pivot axis between
  m. an open position wherein a catch lip of the catch plate is spaced from the inboard lip sufficiently for one end of the block to be inserted between the inboard lip and the top of the rack and for the other end of the block to be moved past the catch lip toward the rack top, and
  n. a closed position wherein the catch lip is biased toward the inboard lip sufficiently to engage the block so that the block is retained at its ends between the respective lips and the top,
  o. a crank rod eccentric to the pivot axis on at least one end of the pivot rod,
  p. the catch plate connected to the pivot rod and the crank rod so that the catch plate revolves about the pivot axis responsive to movement of the crank rod, and
  q. a spring connected at one end to the crank rod and at another end to the rack at a point spaced away from the periphery and the pivot axis so that the spring biases the catch lip as defined above and acts through a straight centerline extending from the crank rod away from the vehicle periphery,
  r. the crank rod oriented to the catch plate so that the spring centerline extends above the pivot axis and the catch lip is biased away from the inboard lip when the catch plate is in the open position, and so that the spring centerline extends below the pivot axis and the catch lip is biased toward the inboard lip when the catch plate is in the closed position.

2. The invention as defined in claim 1 with the addition of the following limitations:
  s. a portion of the catch plate opposite the catch lip from the pivot axis extending toward the inboard lip from the pivot axis when the crank rod is in the open position so that when one end of the block is inserted between the inboard lip and the top of the rack and pushed toward the top of the rack as defined above, the other block end will contact the catch plate and pivot the catch lip toward the inboard lip until the spring centerline is below the pivot axis,
  t. stop tabs on the rack positioned to abut the catch plate when in the open position.

3. A process involving
  a. a vehicle having
  b. an underside spaced above the ground,
  c. a periphery at the underside, and
  d. at least one leveling jack mounted on the vehicle;
wherein the improved method for using the jack comprises the steps of:
  e. extending a base of the leveling jack toward the ground, and
  f. obtaining a block from a storage rack mounted on the vehicle underside at the periphery near the jack by
  g. pivoting a catch lip of the rack, already engaged beneath and supporting the block end, toward the vehicle periphery until
  h. disengaging the catch lip from the block, then
  i. allowing the block end to fall from the rack while
  j. grasping the block with a hand,
  k. pulling the block downward and toward the vehicle periphery and
  l. disengaging the other block end from between a top of the rack, and a stationary inboard lip of the rack that is spaced away from the vehicle periphery; then
  m. positioning the block on the ground below the base of the jack,
  n. jacking the base of the jack onto the block, and
  o. exerting the load of the jack substantially over the surface area of the block on the ground, then p. unjacking the base of the jack from the block,
q. removing the load of the jack from the block,
r. retracting the base of the jack toward the underside of the vehicle, and
s. storing the block in the storage rack by
t. grasping the block with a hand,
u. lifting the block from the ground,
v. positioning the block below the rack and
w. inserting one end of the block between the inboard lip of the rack and the top of the rack, then
x. pressing the block toward the rack top, and
y. pivoting the catch lip of the rack toward the inboard lip until
z. engaging the catch lip with the block, thereby
aa. supporting the block by the lips and
bb. retaining the block between the rack top and the lips at each block end.

* * * * *